(12) United States Patent
Pervaiz et al.

(10) Patent No.: US 12,530,188 B2
(45) Date of Patent: Jan. 20, 2026

(54) MACHINE LEARNING-BASED SYSTEM FOR CODE DEVELOPMENT AND RELEASE

(71) Applicant: Bank of America Corporation, Charlotte, NC (US)

(72) Inventors: Yasir Pervaiz, Lombard, IL (US); Jack Bishop, III, Evanston, IL (US); Luqman Sharief, Libertyville, IL (US)

(73) Assignee: Bank of America Corporation, Charlotte, NC (US)

( * ) Notice: Subject to any disclaimer, the term of this patent is extended or adjusted under 35 U.S.C. 154(b) by 160 days.

(21) Appl. No.: 18/514,131

(22) Filed: Nov. 20, 2023

(65) Prior Publication Data
US 2025/0165248 A1    May 22, 2025

(51) Int. Cl.
*G06F 9/44* (2018.01)
*G06F 8/658* (2018.01)

(52) U.S. Cl.
CPC .................................. *G06F 8/658* (2018.02)

(58) Field of Classification Search
CPC ....................................................... G06F 8/658
See application file for complete search history.

(56) References Cited

U.S. PATENT DOCUMENTS

| | | |
|---|---|---|
| 2022/0398129 A1 | 12/2022 | Bishop, III et al. |
| 2023/0029624 A1* | 2/2023 | Olejarz .................... G06F 8/77 |
| 2023/0030161 A1 | 2/2023 | Bishop, III et al. |
| 2023/0030546 A1* | 2/2023 | Forrest .................. G06F 11/302 |
| 2023/0229413 A1* | 7/2023 | Basu ........................ G06F 8/71 |
| 2023/0259449 A1* | 8/2023 | Mietke ................ G06F 11/3688 |
| | | 717/124 |

* cited by examiner

*Primary Examiner* — Hang Pan
(74) *Attorney, Agent, or Firm* — Banner & Witcoff, Ltd.

(57) ABSTRACT

Arrangements for machine learning-based code development and release are provided. In some examples, a request to release code may be received from a developer portal and may include the code and a type of release. Based on the type of release, one or more requirements for release may be identified by a rules engine. Code testing data responsive to the one or more requirements may be retrieved from the developer portal and a machine learning model may be executed using the code, type of release and code testing data as inputs. The model may output a release authorization decision. If the release authorization decision includes approval of the release, the code may be deployed to a production environment. If the release authorization decision includes a denial of the request to release the code, the code may be returned to the developer portal for further modification or testing.

20 Claims, 11 Drawing Sheets

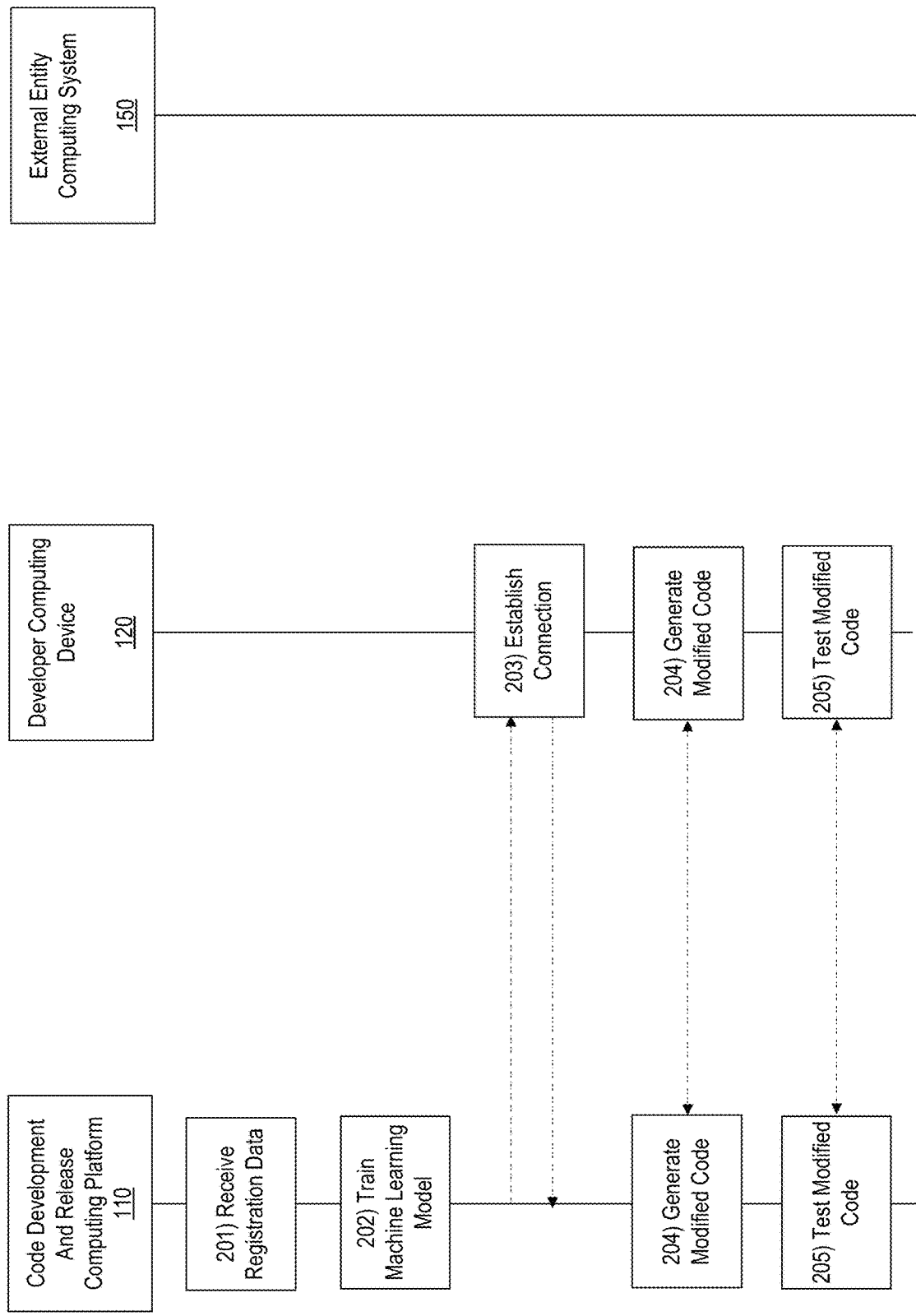

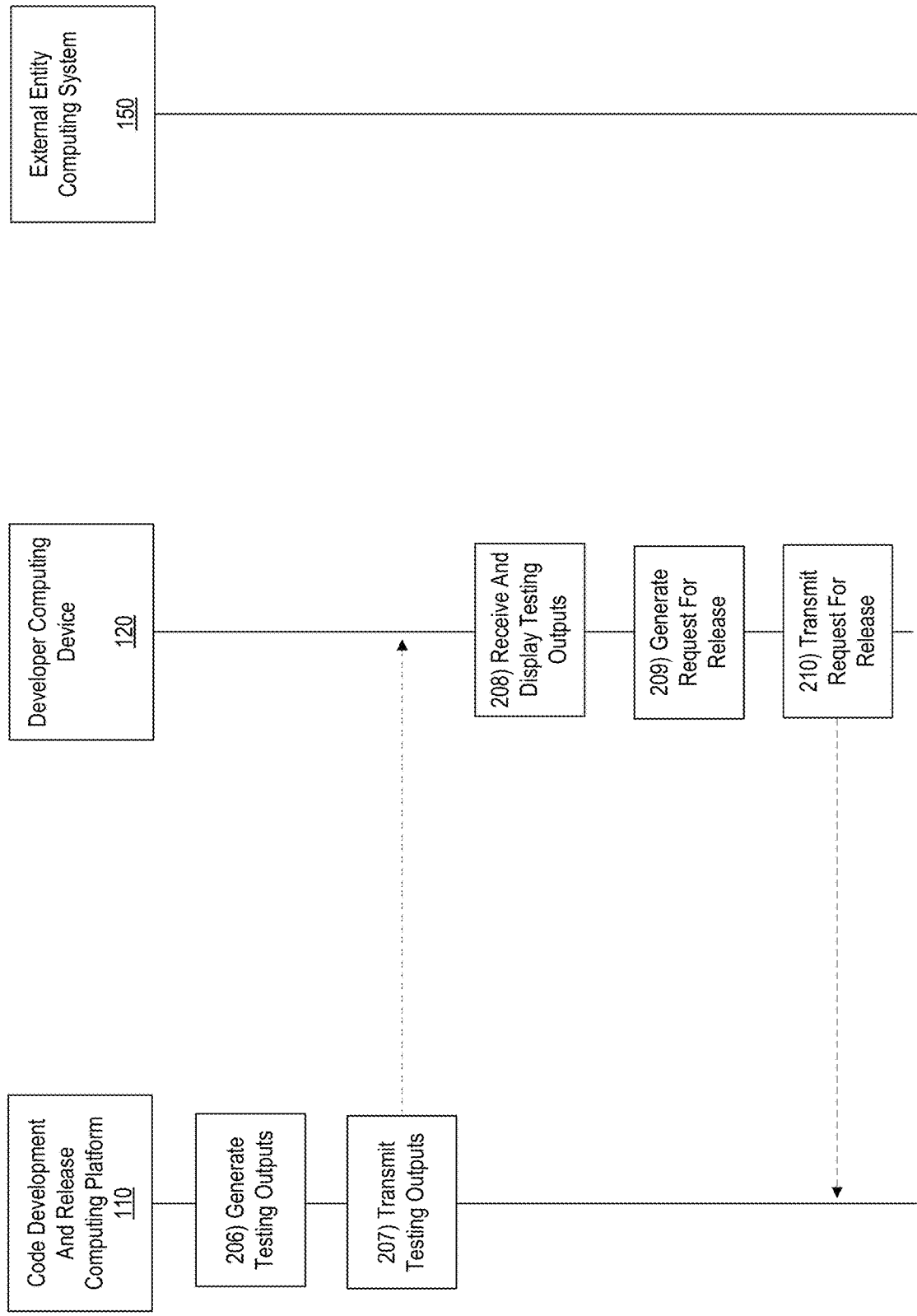

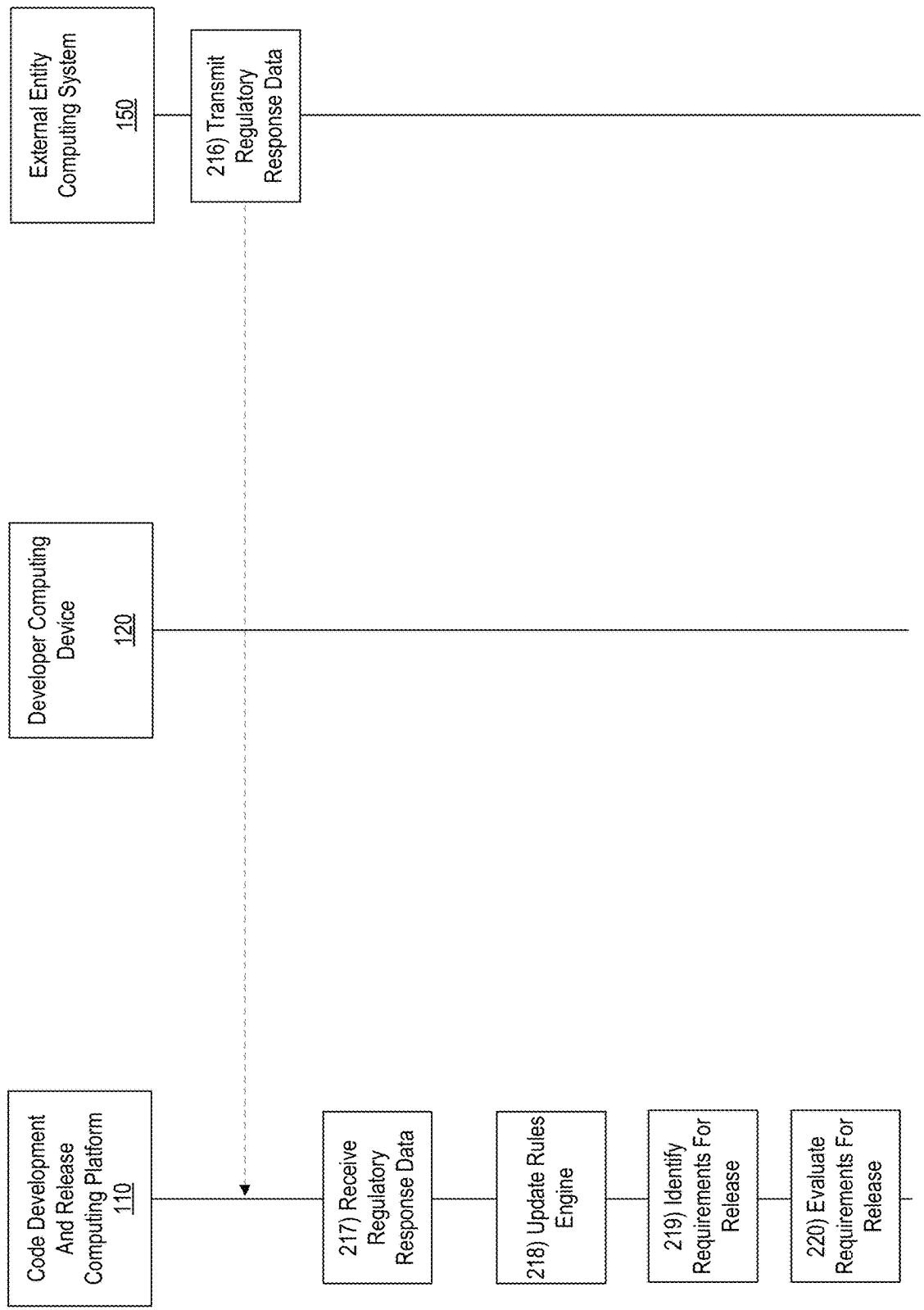

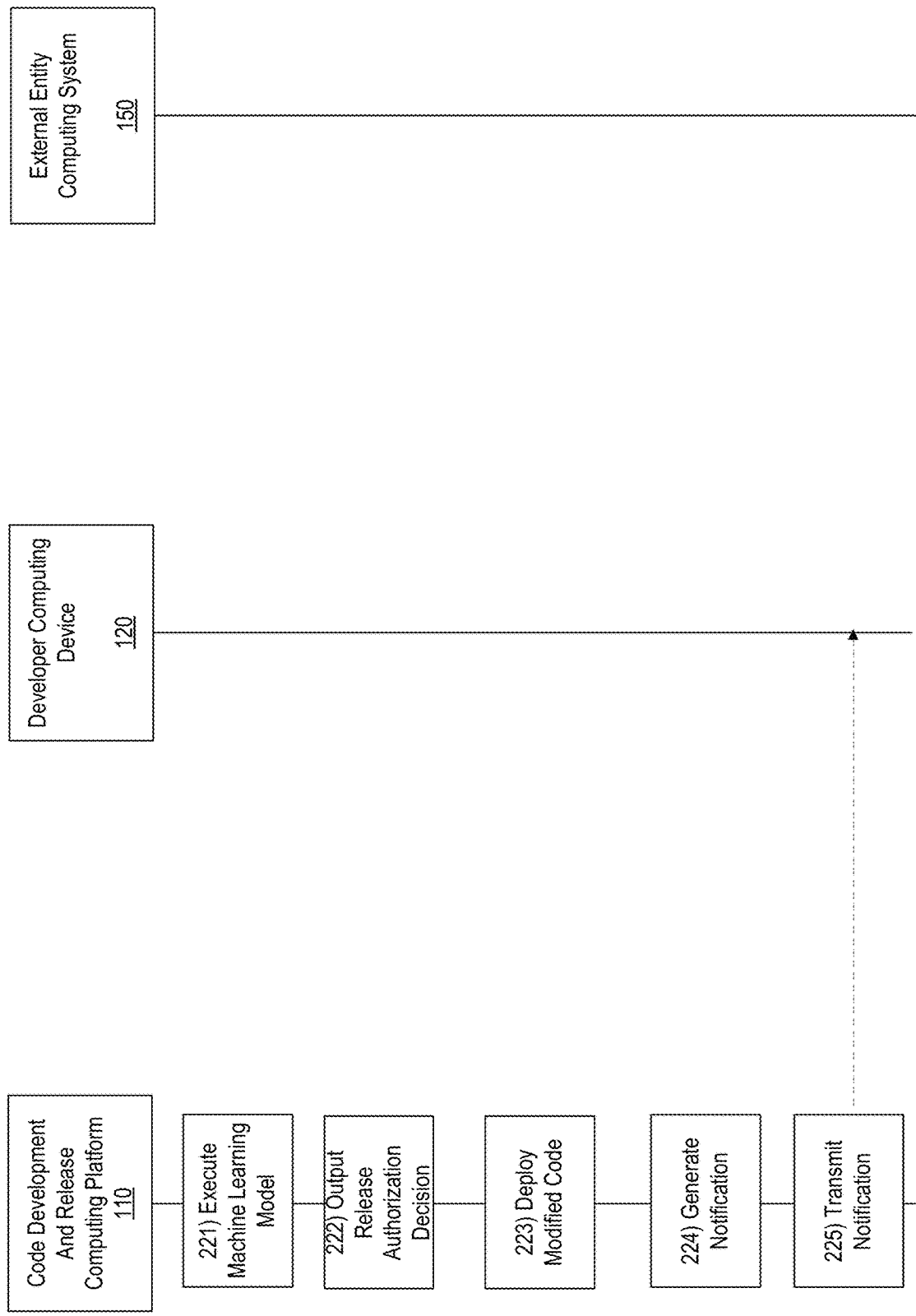

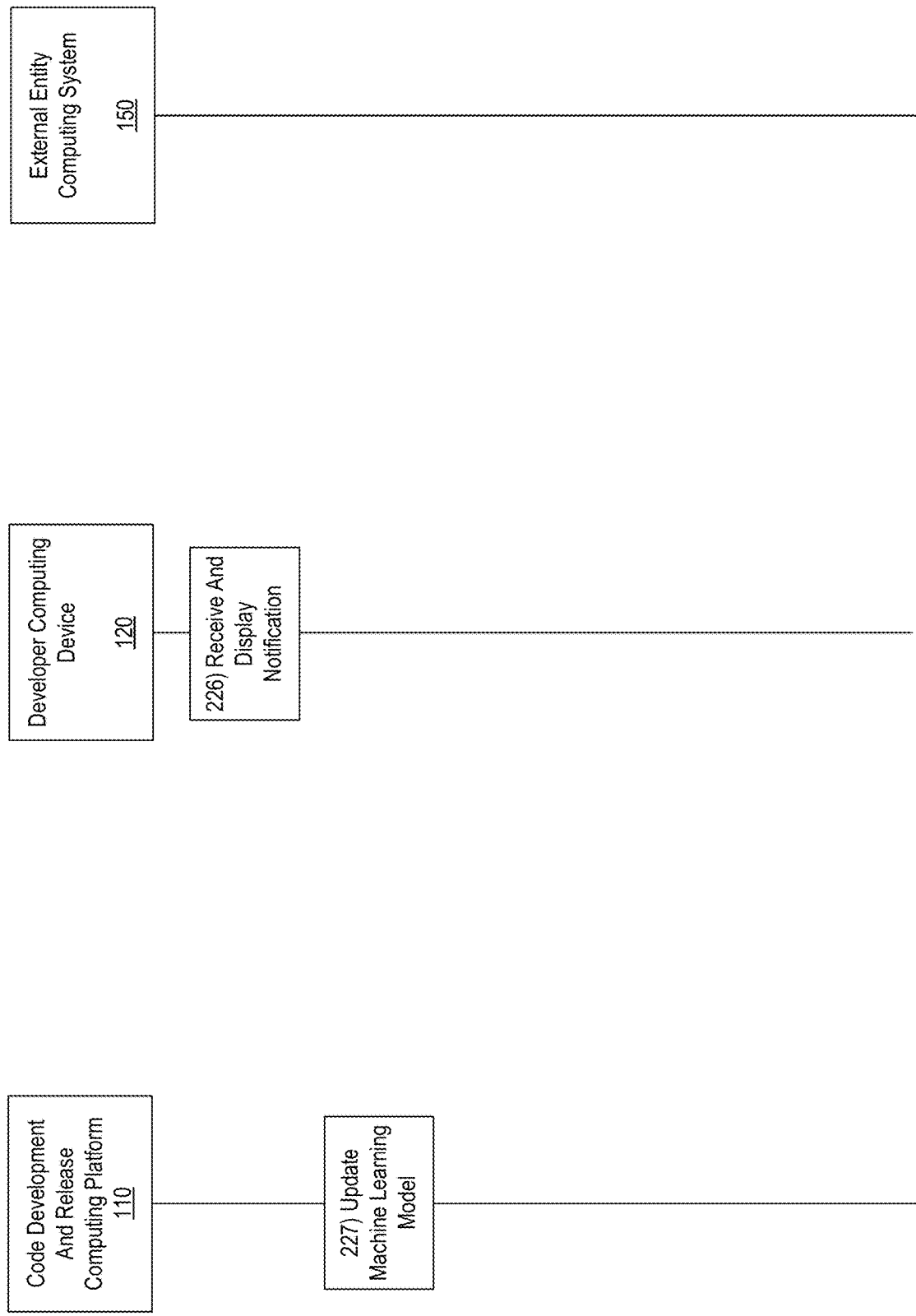

MACHINE LEARNING-BASED SYSTEM FOR CODE DEVELOPMENT AND RELEASE

BACKGROUND

Aspects of the disclosure relate to electrical computers, systems, and devices for development and deployment of code based on machine learning analysis.

In conventional arrangements, developers much manually coordinate development and release of code with various security teams in order to meet regulatory and other requirements. Each release must be examined against a backlog of releases to coordinate the process. Further, conventional arrangements generally rely on standard testing and reporting schemes for evaluating code for release. This can consume unnecessary computing processing power, particularly when all available tests are not required for release. Accordingly, it would be advantageous to provide an agile developer portal that would provide for development and testing of code, as well as machine learning-based determination of whether code is authorized for release.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with intelligently and efficiently developing and releasing code or modified code.

In some examples, a request to release code or modified code may be received from a developer portal. In some examples, the request to release the code or modified code may include the code or modified code, as well as a type of release. Based on the type of release, one or more requirements for release may be identified by a rules engine. In some examples, the requirements for release may include testing requirements, documentation requirements, and the like, and may be based, at least in part, on the type of release. In some examples, code or modified code testing data responsive to the one or more requirements may be retrieved from the developer portal.

In some examples, a machine learning engine may be executed using the code or modified code, type of release and code or modified code testing data as inputs. The machine learning model may output a release authorization decision. If the release authorization decision includes approval of the request to release the code or modified code, the code or modified code may be deployed to a production environment. If the release authorization decision includes a denial of the request to release the code or modified code, the code or modified code may be returned to the developer portal for further modification or testing and a notification may be generated and transmitted to the developer computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for code development and release in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional software developer arrangements require developers to coordinate with various security teams to execute testing, ensure release requirements are met, and the like. These arrangements often include a one-size-fits-all approach to testing of software code or modified code which may include executing unnecessary tests of the code or modified code. This can result in inefficient use of computer processing resources and can result in inefficiencies in evaluating code or modified code for release.

Accordingly, aspects described herein provide for an agile developer portal that enables developers to write, compile, and test code autonomously (e.g., without coordination with various security teams and the like). For instance, rather than executing all defined steps of a release evaluation process (e.g., static testing, dynamic testing, application programming interface testing, open source testing, and the like), a customized approach to testing and evaluation may be provided. The developer portal may generate documentation or evidence of the development of software code or modifications to existing software code (e.g., modified code), as well as outcomes of one or more tests executed by the developer portal. In some examples, a rules engine may store rules identifying requirements (e.g., type of tests for execution, documentation or evidence necessary for release, and the like) for release of code or modified code based on the type of release. The data generated by the developer portal may be analyzed, along with the code and type of release scheduled or requested for the code or modified code, using a machine learning model that may output a release authorization decision. If the release authorization decision authorizes release, the code or modified code may be deployed to a production environment. If not, the code or modified code may be returned to the developer portal for further modifications and/or testing.

These and various other arrangements will be discussed more fully below.

Figure 1A:
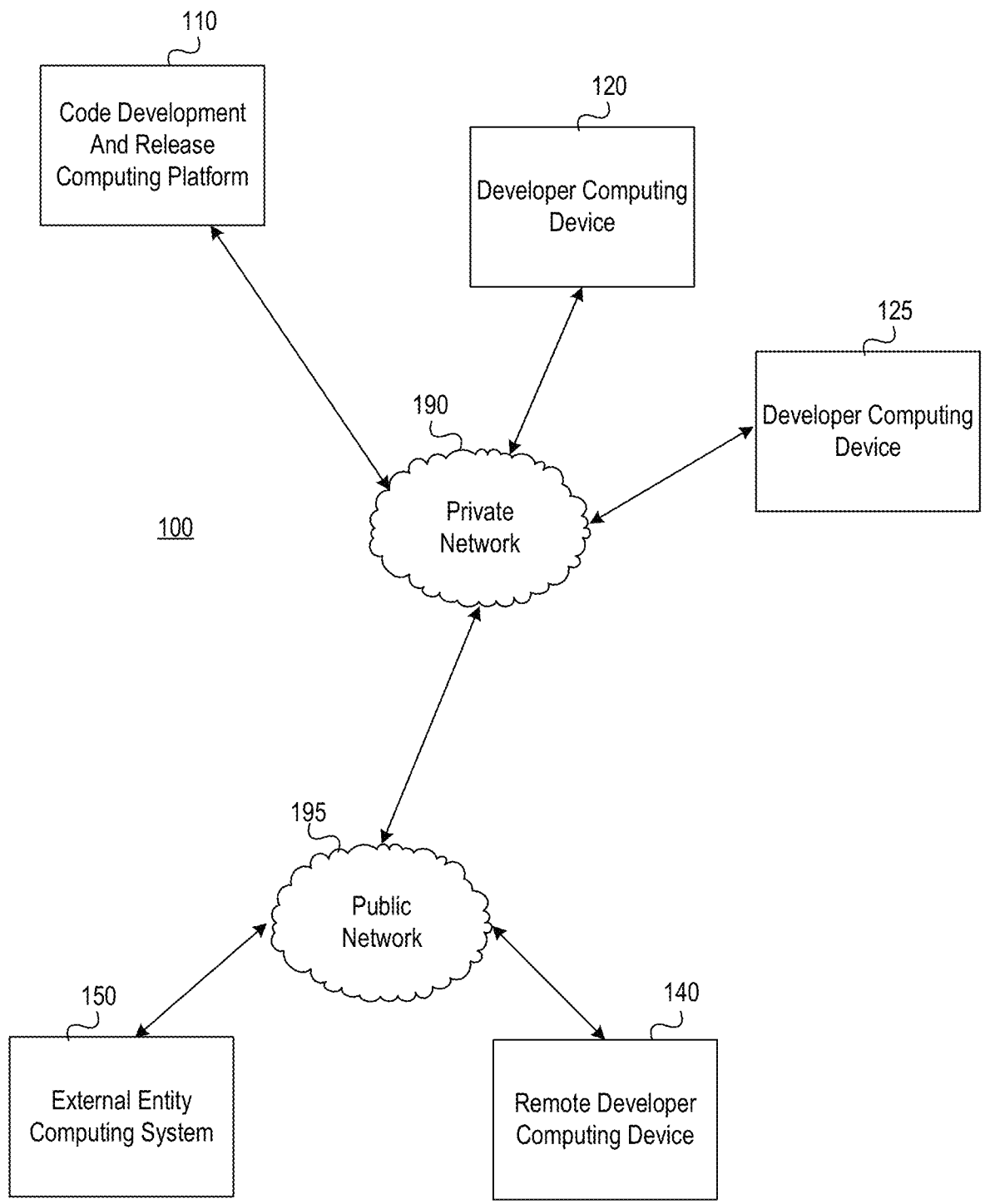
FIGS. 1A-1B depict an illustrative computing environment for code development and release in accordance with one or more aspects described herein.
Figure 1B:
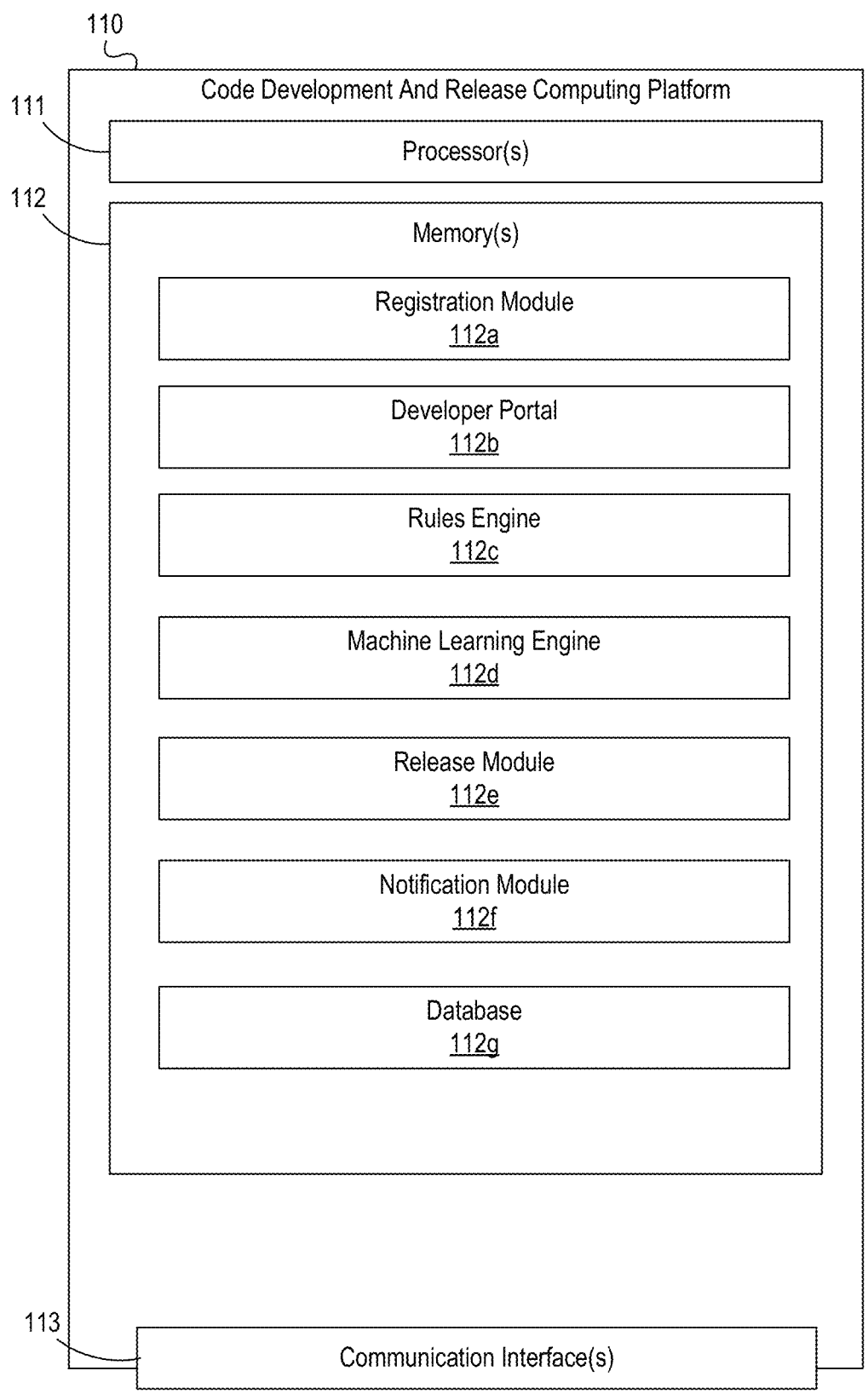

FIGS. 1A-1B depict an illustrative computing environment for implementing agile code development and release function in accordance with one or more aspects described herein. Referring to FIG. 1A, computing environment 100 may include one or more computing devices and/or other computing systems. For example, computing environment 100 may include code development and release computing platform 110, developer computing device 120, developer computing device 125, remote developer computing device 140 and external entity computing system 150. Although two developer computing devices 120, 125, one remote developer computing device 140 and one external entity computing system 150 are shown, more or fewer devices or systems may be used without departing from the invention.

Code development and release computing platform 110 may be or include one or more computing devices (e.g., servers, server blades, or the like) and/or one or more computing components (e.g., memory, processor, and the like) and may be configured to provide dynamic, efficient, intelligent software code development, testing and release. For instance, code development and release computing platform 110 may include a developer portal through which developers (e.g., via one or more of developer computing device 120, developer computing device 125, remote developer computing device 140, or the like) may write code or code modifications, test code or code modifications, identify and correct defects in code, generate testing outputs to record executed tests and associated results, and evaluate the code, testing outputs, release type, and the like, using machine learning, to determine whether the code or modified code is authorized for release or deployment to a production environment. Code development and release computing platform 110 may further execute release of code or modified code, generate and transmit notifications for additional testing, and the like.

In some examples, code development and release computing platform 110 may include a rules engine that may outline or define requirements for release of code based on a type of release. For instance, testing requirements, threshold for release, and the like, may be based on a type of release scheduled for the code being evaluated. In some examples, the rules engine may include rules based on scope of impact (e.g., modified code that impacts a small number of systems or devices may have less stringent requirements than modified code that impacts a large number of systems or devices). In some arrangements, the rules engine may receive regulatory requirements from one or more external sources, such as external entity computing system 150.

Developer computing device 120 and developer computing device 125 may be or include computing devices such as desktop computers, laptop computers, tablets, smartphones, wearable devices, and the like, that may be used by developers internal to the enterprise organization implementing the code development and release computing platform 110. Developer computing device 120 and/or developer computing device 125 may access a developer portal on the code development and release computing platform 110 to write code, modify code, test code or modified code, and the like. Accordingly, developer computing device 120 and/or developer computing device 125 may execute all aspects of development of code from writing the code to deployment via the developer portal executing on the code development and release computing platform 110. Although two developer computing devices are shown, more of fewer may be used without departing from the invention.

Remote developer computing device 140 may be or include computing devices such as desktop computers, laptop computers, tablets, smartphones, wearable devices, and the like, that may be used by developers external to the enterprise organization implementing the code development and release computing platform 110 (e.g., connected via a public network such as the internet). Remote developer computing device 140 may access, with permission, a developer portal on the code development and release computing platform 110 to write code, modify code, test code or modified code, and the like. Accordingly, remote developer computing device 140 may execute all aspects of development of code from writing the code to deployment via the developer portal executing on the code development and release computing platform 110. Although one remote developer computing device is shown, more may be used without departing from the invention.

External entity computing system 150 may be or include one or more computing devices (e.g., servers, server blades, or the like) and/or one or more computing components (e.g., memory, processor, and the like) and may be associated with one or more entities external to the enterprise organization. For instance, external entity computing system 150 may be associated with one or more regulatory or governing bodies and may store release requirements (e.g., testing requirements, documentation requirements, and the like) for release or deployment of code or modified code. In some examples, code development and release computing platform 110 may communicate with external entity computing system 150 to retrieve various requirements on a periodic or aperiodic basis. Although one external entity computing system is shown, more may be used without departing from the invention.

As mentioned above, computing environment 100 also may include one or more networks, which may interconnect one or more of code development and release computing platform 110, developer computing device 120, developer computing device 125, remote developer computing device 140 and/or external entity computing system 150. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, code development and release computing platform 110, developer computing device 120, and/or developer computing device 125, may be associated with an enterprise organization (e.g., a financial institution), and private network 190 may be associated with and/or operated by the organization, and may include one or more networks (e.g., LANs, WANs, virtual private networks (VPNs), or the like) that interconnect code development and release computing platform 110, developer computing device 120, and/or developer computing device 125, and one or more other computing devices and/or computer systems that are used by, operated by, and/or otherwise associated with the organization. Public network 195 may connect private network 190 and/or one or more computing devices connected thereto (e.g., code development and release computing platform 110, developer computing device 120, and/or developer computing device 125) with one or more networks and/or computing devices that are not associated with the organization. For example, remote developer computing device 140 and/or external entity computing system 150 might not be associated with an organization that operates private network 190 (e.g., because remote developer computing device 140 and/or external entity computing system 150 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote developer computing device 140 and/or external entity computing system 150 to private network 190 and/or one or more computing devices connected thereto (e.g., code development and release computing platform 110, developer computing device 120, and/or developer computing device 125).

Referring to FIG. 1B, code development and release computing platform 110 may include one or more processors 111, memory 112, and communication interface 113. A data bus may interconnect processor(s) 111, memory 112, and communication interface 113. Communication interface 113 may be a network interface configured to support communication between code development and release computing platform 110 and one or more networks (e.g., network 190, network 195, or the like). Memory 112 may include one or more program modules having instructions that when executed by processor(s) 111 cause code development and release computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of code development and release computing platform 110 and/or by different computing devices that may form and/or otherwise make up code development and release computing platform 110.

For example, memory 112 may have, store and/or include registration module 112*a*. Registration module 112*a* may include instructions and/or data that may cause or enable the code development and release computing platform 110 to receive, from a plurality of developers and/or developer computing devices, registration data. In some examples, the registration data may include identification of the user/developer, identification of one or more computing devices associated with the user/developer, and the like. In response to receiving the registration data, the registration data may be stored (e.g., in database 112*g*) and, in some examples, authentication credentials may be provided to the registered users/developers to access the developer portal, request release authorization, and the like. In some examples, registration data may be received from developers/users internal to the enterprise organization and external to the enterprise organization.

Code development and release computing platform 110 may further have, store and/or include developer portal 112*b*. Developer portal 112*b* may store instructions and/or data that may cause or enable code development and release computing platform 110 to interact with one or more developer computing devices (e.g., developer computing device 120, developer computing device 125, remote developer computing device 140, and the like) to enable users/developers to write or modify code, compile code, test code, generate a record of executed tests, and the like. In some examples, developers may be able to execute all aspects of code development from writing code to releasing code to deploy in a production environment via the developer portal 112*b*. The developer portal 112*b* may provide evidence of executed tests, code performance, and the like, to, for instance, a machine learning model, to enable execution of the model to output a release authorization output.

Code development and release computing platform 110 may further have, store and/or include rules engine 112*c*. Rules engine 112*c* may store instructions and/or data that may cause or enable the code development and release computing platform 110 to generate and/or receive (e.g., from external entity computing system 150) one or more rules, requirements, or the like, to be met for release of developed code or a code modification. In some examples, the rules engine 112*c* may include requirements for release based on a type of release (e.g., minor release, major release, integrated release, maintenance release, emergency fix, or the like). In some examples, rules engine 112*c* may store rules for release of code based on impact or potential impact to systems (e.g., systems of the enterprise organization). For instance, requirements for a release that may impact less than a threshold number of systems or devices may be different (e.g., less stringent) than requirements for a release that may impact at least the threshold number of systems or devices.

Code development and release computing platform 110 may further have, store and/or include machine learning engine 112*d*. Machine learning engine may store instructions and/or data that may cause or enable the code development and release computing platform 110 to train, execute, update and/or validate one or more machine learning models. For instance, machine learning engine 112*d* may train a release authorization machine learning model to output, based on inputs related to the type of release, evidence or records of testing, code or modified code, and the like, a decision of whether the code or modified code is authorized for release or deployment to a production environment.

Code development and release computing platform 110 may further have, store and/or include release module 112*e*. Release module 112*e* may store instructions and/or data that may cause or enable the code development and release computing platform 110 to receive a release authorization (e.g., output by the machine learning model executed by the machine learning engine 112*d*) and automatically release the code or modified code being evaluated. In some examples, automatically releasing the code or modified code may include deploying the code or modified code in a production environment.

Code development and release computing platform 110 may further have, store and/or include notification module 112*f*. Notification module 112*f* may store instructions and/or data that may cause or enable code development and release computing platform 110 to receive an output from the machine learning model indicating that the code is not authorized for release and, in response, generating one or more notifications indicating that additional testing, evidence, or the like, is required prior to release.

Code development and release computing platform 110 may further have, store and/or include database 112*g*. Database 112*g* may store data associated with registered users, historical code modifications, regulatory and other requirements (e.g., testing requirements, records requirements, and the like) associated with authorization to release code, and/or other data that enables performance of aspects described herein by the code development and release computing platform 110.

FIGS. 2A-2F depict one example illustrative event sequence for implementing code development and release functions in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

With reference to FIG. 2A, at step 201, code development and release computing platform 110 may receive registration data. For instance, code development and release computing platform 110 may receive, from one or more users/developers, registration data including user identifiers, device identifiers, and the like. In some examples, the registration data may include a request to register with the code development and release computing platform 110 in order to access the developer portal and, in response, the users/developers may receive authentication credentials to access the code development and release computing platform 110.

At step 202, code development and release computing platform 110 may train a machine learning model. For instance, historical data related to release of the code or code modifications, testing associated with the code or code modifications, outcome of testing, regulatory or other requirements for testing, issues addressed, and the like, may be used to train the machine learning model to output a determination of whether or not to authorize release of the code or modified code for deployment in a production environment. For instance, previous code generated, modifications to code, testing associated with the code or modification and outcomes of the testing, documentation generated from testing, requirements for testing, as well as whether code was released or at what point code was released, whether additional issues arose after release, and the like, may be used to train the machine learning model to output a release authorization decision. Accordingly, the machine learning model may learn to recognize patterns or sequences in code, testing requirements, outcome of testing, and the like that may be used to output a release authorization decision (e.g., approval to release, instruction to not release, instructions for additional testing, and the like). In some examples, the machine learning model may output a binary output of release/not release. In other examples, if the decision to not release is output, one or more additional requirements (e.g., additional testing, documentation, or the like) may be identified in order to release the code.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data identifying previous releases, requirements met, and the like) and/or unlabeled data.

At step 203, developer computing device 120 may establish a connection with code development and release computing platform 110. For instance, developer computing device 120 may establish a first wireless connection with code development and release computing platform 110. Upon establishing the first wireless connection, a communication session may be initiated between the developer computing device 120 and the code development and release computing platform 110.

Although aspects shown and described in FIGS. 2A-2F include developer computing device 120, in some examples, processes performed by developer computing device 120 may be performed by other developer computing devices (e.g., developer computing device 125, remote developer computing device 140, or the like) or additional developer computing devices, without departing from the invention.

At step 204, developer computing device 120 initiate interaction with the developer portal of the code development and release computing platform 110 and may generate, via the developer portal, code or modified code (e.g., modifications to existing code).

At step 205, the code development and release computing platform 110 may execute one or more tests on the code or modified code generated at step 204. In some examples, the tests executed may be identified by a developer via developer computing device 120.

With reference to FIG. 2B, at step 206, code development and release computing platform 110 may generate one or more testing outputs. For instance, based on tests executed on the code or modified code, a test output for each test executed may be generated. In some examples, the test output may include an outcome of the test, identified issues, a record of the test and associated output (e.g., documentation or evidence that test was executed), and the like.

At step 207, code development and release computing platform 110 may transmit or send the generated testing outputs to the developer computing device 120. In some examples, transmitting or sending the testing outputs may cause the testing outputs to be displayed by a display of the developer computing device 120.

At step 208, the code development and release computing platform 110 may receive and display the testing outputs. Based on the testing outputs received and displayed, the developer (e.g., via the developer computing device) may identify additional testing or modifications to be made to the code (e.g., and follow-up testing) to be performed prior to evaluating the code or modified code for release. If additional testing or modifications are identified, the process may return to step 204 or 205 to generate additional modifications to the code and/or execute additional testing. Alternatively, if the testing outputs are satisfactory, the process may proceed to step 209.

At step 209, developer computing device 120 may generate a request for release of the code or modified code. For instance, a developer may provide user input to request release of the code or modified code into a production environment. The developer computing device 120 may then generate a signal, command or instruction requesting evaluation of the code or modified code for release.

At step 210, the developer computing device may transmit the request for release to the code development and release computing platform 110.

Figure 2C:
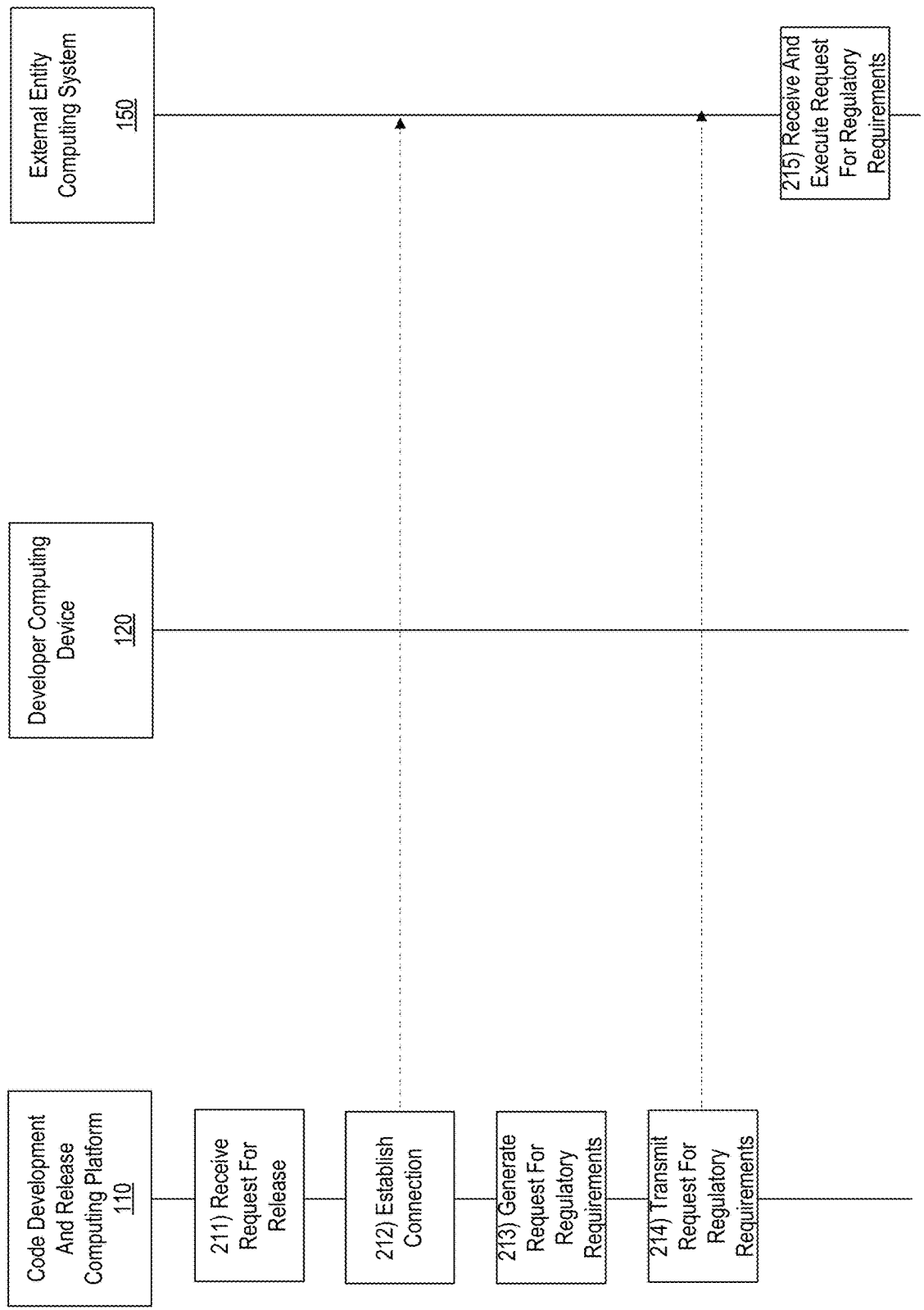

With reference to FIG. 2C, at step 211, code development and release computing platform 110 may receive the request for release and may initiate evaluation of the code or modified code to determine whether release is authorized. For instance, the request for release may include identification of the code for evaluation, a developer computing device 120 associated with the code, a type of release scheduled for the code or modified code, and the like.

At step 212, code development and release computing platform 110 may establish a connection with external entity computing system 150. For instance, a second wireless connection may be established between code development and release computing platform 110 and external entity computing system 150. Upon establishing the second wireless connection, a communication session may be initiated between the code development and release computing platform 110 and the external entity computing system 150.

At step 213, code development and release computing platform 110 may generate a request for regulatory requirements or updated regulatory requirements. For instance, code development and release computing platform 110 may generate a request for current or updated code testing requirements, release requirements, and the like. In some examples, step 213 and 214 may be performed automatically on a periodic or aperiodic basis.

At step 214, code development and release computing platform 110 may transmit or send the request for regulatory requirements to the external entity computing system 150.

At step 215, external entity computing system 150 may receive and execute the request for regulatory requirements. For instance, external entity computing system 150 may identify regulatory requirements or updates to requirements responsive to the request and extract the data from, for instance, one or more databases to generate regulatory response data responsive to the request.

With reference to FIG. 2D, at step 216, external entity computing system 150 may transmit or send the regulatory response data to the code development and release computing platform 110.

At step 217, code development and release computing platform 110 may receive the regulatory response data and, at step 218, code development and release computing platform 110 may update a rules engine. For instance, a rules engine of the code development and release computing platform 110 may include rules or requirements for deployment or release of code or code modifications. In some examples, the rules may be based on regulatory requirements (e.g., types of tests to execute, documentation of tests required, and the like). Additionally or alternatively, the rules may be based on a type of release (e.g., integrated release, major release, or the like). Further, rules may be based on an expected or potential impact of the release (e.g., more systems impacted may mean additional criteria to consider to thresholds to meet before release). Additional rules may be used without departing from the invention. Accordingly, the rules engine may be updated with the regulatory response data to ensure the current regulatory requirements are being implemented.

At step 219, code development and release computing platform 110 may evaluate the code or modified code for release. For instance, code development and release computing platform 110 may identify one or more rules or requirements for release based on the rules engine.

At step 220, code development and release computing platform 110 may evaluate the code or modified code with respect to the identified requirements for release. For instance, code development and release computing platform 110 may evaluate the code, one or more test outputs, documentation or evidence of testing performed, and the like, to determine whether sufficient information to evaluate the code or modified code for release has been provided. For instance, the rules engine may identify (e.g., based on a type of release) particular tests that should have been conducted for the code or modified code, as well as documentation or evidence of those tests that should be provided). In some examples, the rules engine may retrieve, from the developer portal, the data related to the tests executed, documentation generated, type of release, and the like.

With reference to FIG. 2E, at step 221, code development and release computing platform 110 may execute the machine learning model. For instance, the machine learning model may receive, as inputs, the code or modified code, information related to tests executed and outcome of tests, documentation, type of release, and the like (e.g., from developer portal, rules engine, or the like) and, based on execution of the machine learning model, may output, at step 222, a release authorization decision. For instance, the machine learning model may identify patterns or sequences in the inputs to determine whether the code or modified code meets requirements for release or deployment.

In some examples, the release authorization decision may include a binary output of approval/denial of the request for release. Additionally or alternatively, an output denying the request to release the code or modified code may include additional information related to modifications, testing, or the like, to be performed prior to re-evaluation for release. Accordingly, if the code or modified code is approved for release, the process may proceed to step 223 and the code may be automatically deployed to a production environment. The process may then proceed to step 227.

Figure 4:
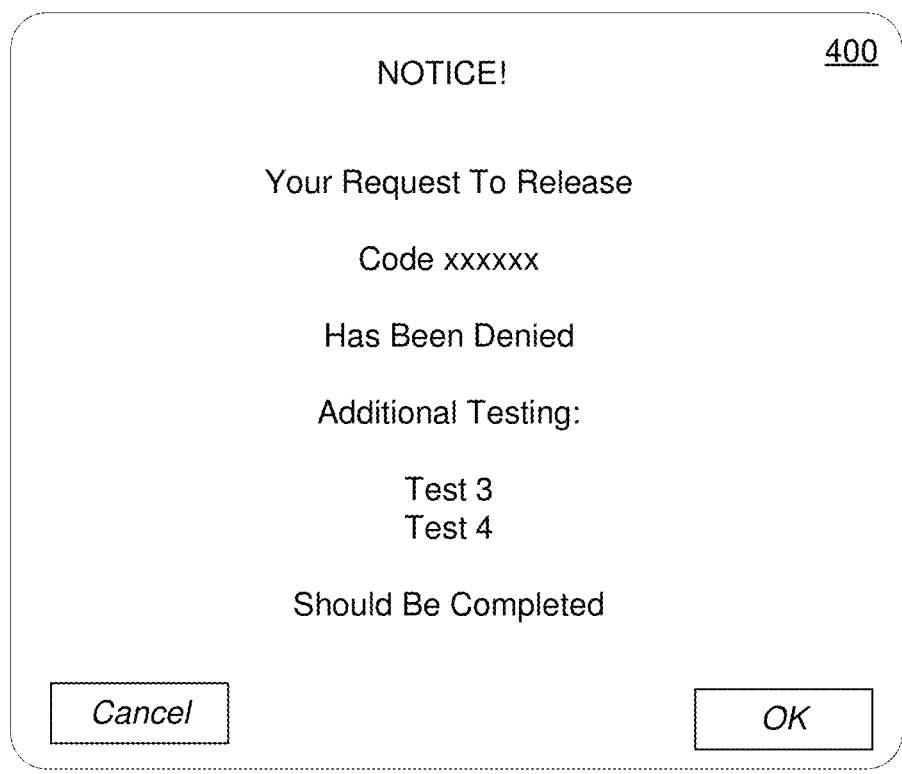
FIG. 4 illustrates an example graphical user interface that may be generated in accordance with one or more aspects described herein.

If the release authorization decision does not include an authorization to release the code or modified code, at step 224, code development and release computing platform 110 may generate a notification indicating that the request to approve release of the code has been denied. For instance, FIG. 4 illustrates one example notification 400 that may be generated. The notification 400 includes an indication that the request to approve release of the code or modified code has been denied. In some examples, the notification may include information related to additional or follow up modifications, testing, or the like, to be performed.

At step 225, code development and release computing platform 110 may transmit or send the notification to the developer computing device 120. In some examples, transmitting or sending the notification may cause the notification to be displayed by a display of the developer computing device 120.

With reference to FIG. 2F, at step 226, developer computing device 120 may receive and display the notification transmitted at step 225.

At step 227, code development and release computing platform 110 may update and/or validate the machine learning model. For instance, information related to the inputs, generated output, deployment, identified issues, and the like, may be provided via a dynamic feedback loop to continuously update the machine learning model to improve accuracy and the like.

In some instances, the code development and release computing platform 110 may continuously update, validate, refine, or the like, the machine learning model. In some examples, the code development and release computing platform 110 may maintain an accuracy threshold for the machine learning model and may pause refinement (through the dynamic feedback loop) of the model if the corresponding accuracy is identified as greater than the accuracy threshold. Further, if the accuracy is at or below the accuracy threshold, the code development and release computing platform 110 may resume refinement of the model through the corresponding dynamic feedback loop.

Figure 3:
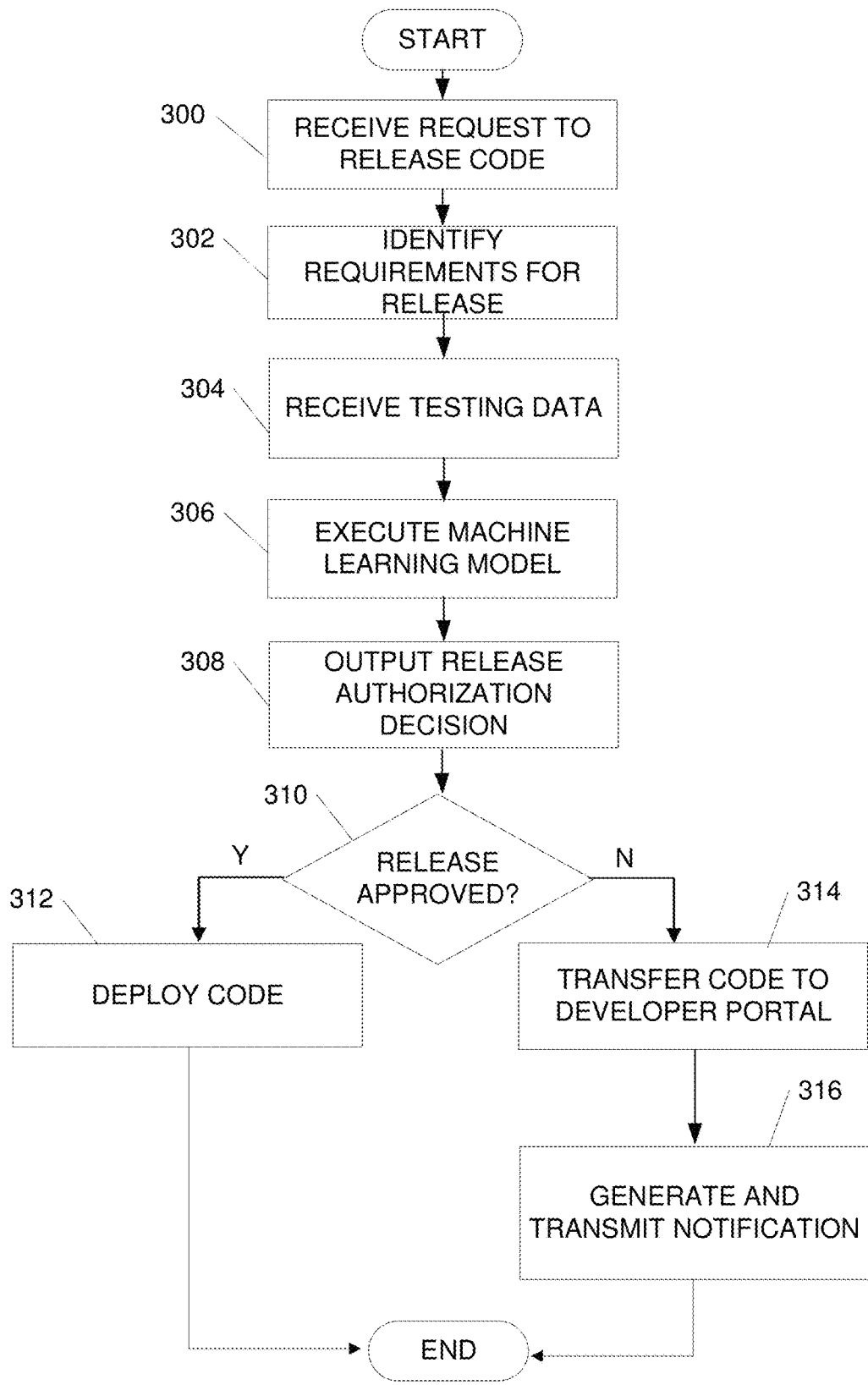
FIG. 3 depicts an illustrative method for code development and release in accordance with one or more aspects described herein.

FIG. 3 is a flow chart illustrating one example method of code development and release in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as code development and release computing platform 110, may receive, from a developer portal, a request to release modified code. For instance, a developer may, via a developer computing device, interact with the developer portal to generate code or modified code, test the code, and the like. Upon completion, the developer may request evaluation of the code by the computing platform for release. In some examples, the request for release may include the code or modified code and an identified type of release for the code or modified code. In some examples, the type of release may include a major release, a minor release, an integrated release or an emergency fix.

At step 302, the computing platform may identify, by a rules engine, and based on the code or modified code and type of release, one or more requirements for release of the modified code. For instance, the rules engine may store rules related to regulatory requirements, testing requirements, documentation or evidence requirements, and the like for various types of releases. In some examples, the regulatory requirements may be received by the rules engine from an external entity computing system.

Based on the identified requirements, the computing platform may retrieve, from the developer portal, modified code testing data responsive to the one or more requirements for release of the code or modified code at step 304. For instance, data related to one or more tests executed, an outcome of the tests, documentation associated with the tests, and the like, may be retrieved from the developer portal. In some examples, the tests may be executed by the developer portal and the developer portal may generate and store the outcome of the tests, associated documentation or evidence, and the like.

At step 306, the computing platform may execute a machine learning model. For instance, executing the machine learning model may include inputting the code or modified code, the identified type of release, and the modified code testing data retrieved from the developer portal. Upon execution of the machine learning model, the machine learning model may output a release authorization decision at step 308.

At step 310, a determination may be made as to whether the release authorization decision includes approval of the request to release the code or modified code or modified code for release. If so, at step 312, the code or modified code may be deployed to a production environment. In some examples, deploying the code or modified code may be performed automatically (e.g., without additional user input or interaction and based on the machine learning model output).

If, at step 310, the release authorization decision includes denial of the request to release the code or modified code, at step 314, the code or modified code may be transferred back to the developer portal for additional modifications, testing, and the like. At step 316, a notification indicating the denial of the request to release the code or modified code may be generated and transmitted to a developer computing device. In some examples, transmitting the notification may cause the notification to be displayed on a display of the developer computing device.

As discussed herein, aspects described include an agile developer portal that enables developers to autonomously write, compile and test software code or code modifications and, in some examples, automatically release the code or modified code based on machine learning analysis of whether the code or modified code meets requirements for release.

Accordingly, machine learning may be used to analyze code and documentation associated with developer and testing of code (e.g., issues identified and addressed, types of testing executed, and the like), as well as a type of release, to determine whether requirements for release are met and, in some examples, automatically deploy the code or modified code. Accordingly, the system may identify an impact of a change to a piece of software code and may customize requirements for release of that code modification (e.g., if a change to a first portion of software is made but no changes are made to a second portion, the system may determine whether the development and testing of modifications to the first portion are sufficient for release and might not evaluate aspects of the second portion, thereby saving time and computing resources). For example, if a change is made to source code but not open source code, the system may determine that there is no need for open source scanning or evaluation of the open source code because no changes have been made. Accordingly, of the evidence retrieved from the developer portal supports release of the update based on evaluation of the source code modifications, the modified code may be released.

The use of machine learning in conjunction with the developer portal may ensure efficient release of new or modified software code. For instance, new functions or features may be added to software quickly and efficiently while ensuring that all regulatory and other requirements for release are met.

Figure 5:
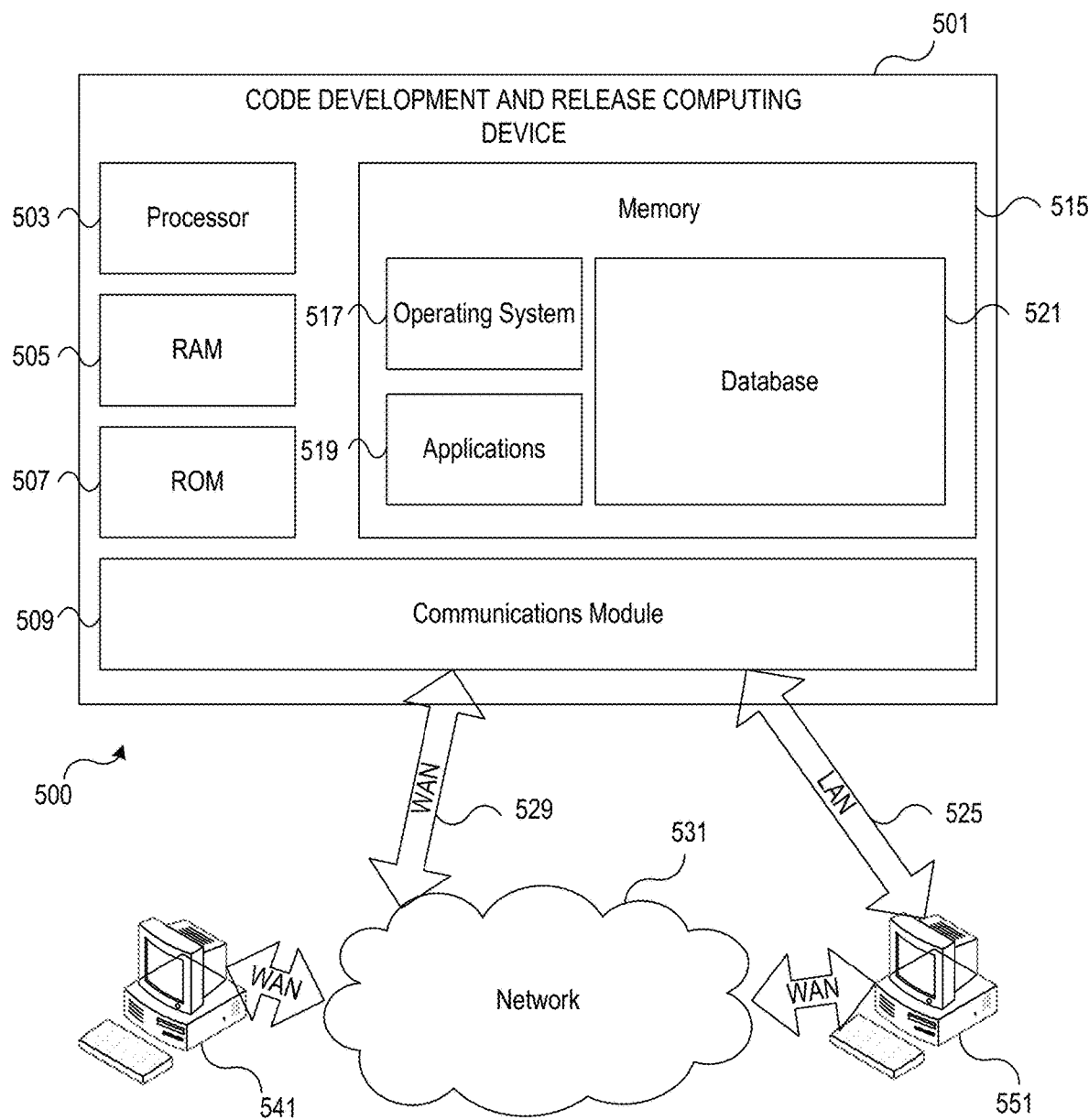
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include code development and release learning computing device 501 having processor 503 for controlling overall operation of code development and release computing device 501 and its associated components, including Random Access Memory (RAM) 505, Read-Only Memory (ROM) 507, communications module 509, and memory 515. Code development and release computing device 601 may include a variety of computer readable media. Computer readable media may be any available media that may be accessed by code development and release computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by code development and release computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on code development and release computing device 501. Such a processor may execute computer-executable instructions stored on a computer-readable medium.

Software may be stored within memory 515 and/or storage to provide instructions to processor 503 for enabling code development and release computing device 501 to perform various functions as discussed herein. For example, memory 515 may store software used by code development and release computing device 501, such as operating system 517, application programs 519, and associated database 521. Also, some or all of the computer executable instructions for code development and release computing device 501 may be embodied in hardware or firmware. Although not shown, RAM 505 may include one or more applications representing the application data stored in RAM 505 while code development and release computing device 501 is on and corresponding software applications (e.g., software tasks) are running on code development and release computing device 501.

Communications module 509 may include a microphone, keypad, touch screen, and/or stylus through which a user of code development and release computing device 501 may provide input, and may also include one or more of a speaker for providing audio output and a video display device for providing textual, audiovisual and/or graphical output. Computing system environment 500 may also include optical scanners (not shown).

Code development and release computing device 501 may operate in a networked environment supporting connections to one or more other computing devices, such as computing device 541 and 551. Computing devices 541 and 551 may be personal computing devices or servers that include any or all of the elements described above relative to code development and release computing device 501.

The network connections depicted in FIG. 5 may include Local Area Network (LAN) 525 and Wide Area Network (WAN) 529, as well as other networks. When used in a LAN networking environment, code development and release computing device 501 may be connected to LAN 525 through a network interface or adapter in communications module 509. When used in a WAN networking environment, code development and release computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive, from a developer portal, a request to release modified code, wherein the request to release the modified code includes the modified code and an identified type of release for the modified code;
      identify, by a rules engine, and based on the modified code and identified type of release for the modified code, one or more requirements for release of the modified code;
      receive, from the developer portal, modified code testing data responsive to the one or more requirements for release of the modified code;
      execute a machine learning model, wherein executing the machine learning model includes inputting the modified code, the identified type of release for the modified code, and the modified code testing data to the machine learning model to output a release authorization decision;
      responsive to the release authorization decision including approval of the request to release the modified code, deploy the modified code in a production environment; and
      responsive to the release authorization decision including denial of the request to release the modified code:
         transfer the modified code to the developer portal for further testing; and
         generate and transmit, to a developer computing device, a notification of the release authorization decision including the denial of the request to release the modified code, wherein transmitting the notification includes causing display of the notification on a display of the developer computing device.

2. The computing platform of claim 1, wherein the modified code is generated by the developer computing device via the developer portal.

3. The computing platform of claim 1, wherein the modified code testing data is generated by executing one or more tests on the modified code via the developer portal.

4. The computing platform of claim 1, wherein the one or more requirements for release of the modified code is based on the type of release.

5. The computing platform of claim 1, wherein the type of release is one of: a major release, a minor release, an integrated release or an emergency fix.

6. The computing platform of claim 1, wherein the one or more requirements for release of the modified code are based, at least in part, on regulatory requirements received by the rules engine.

7. The computing platform of claim 1, wherein the notification of the release authorization decision including the denial of the request to release the modified code includes identification of the further testing.

8. A method, comprising:
   receiving, by a computing platform, the computing platform having at least one processor and memory, and from a developer portal, a request to release modified code, wherein the request to release the modified code includes the modified code and an identified type of release for the modified code;
   identifying, by a rules engine of the computing platform, and based on the modified code and identified type of release for the modified code, one or more requirements for release of the modified code;
   receiving, by the at least one processor and from the developer portal, modified code testing data responsive to the one or more requirements for release of the modified code;
   executing, by the at least one processor, a machine learning model, wherein executing the machine learning model includes inputting the modified code, the identified type of release for the modified code, and the modified code testing data to the machine learning model to output a release authorization decision;
   responsive to the release authorization decision including approval of the request to release the modified code, deploying, by the at least one processor, the modified code in a production environment; and
   responsive to the release authorization decision including denial of the request to release the modified code:
      transferring, by the at least one processor, the modified code to the developer portal for further testing; and
      generating and transmitting, by the at least one processor and to a developer computing device, a notification of the release authorization decision including the denial of the request to release the modified code, wherein transmitting the notification includes causing display of the notification on a display of the developer computing device.

9. The method of claim 8, wherein the modified code is generated by the developer computing device via the developer portal.

10. The method of claim 8, wherein the modified code testing data is generated by executing one or more tests on the modified code via the developer portal.

11. The method of claim 8, wherein the one or more requirements for release of the modified code is based on the type of release.

12. The method of claim 8, wherein the type of release is one of: a major release, a minor release, an integrated release or an emergency fix.

13. The method of claim 8, wherein the one or more requirements for release of the modified code are based, at least in part, on regulatory requirements received by the rules engine.

14. The method of claim 8, wherein the notification of the release authorization decision including the denial of the request to release the modified code includes identification of the further testing.

15. One or more non-transitory computer-readable media storing instructions that, when executed by a computing platform comprising at least one processor, memory, and a communication interface, cause the computing platform to:
receive, from a developer portal, a request to release modified code, wherein the request to release the modified code includes the modified code and an identified type of release for the modified code;
identify, by a rules engine, and based on the modified code and identified type of release for the modified code, one or more requirements for release of the modified code;
receive, from the developer portal, modified code testing data responsive to the one or more requirements for release of the modified code;
execute a machine learning model, wherein executing the machine learning model includes inputting the modified code, the identified type of release for the modified code, and the modified code testing data to the machine learning model to output a release authorization decision;
responsive to the release authorization decision including approval of the request to release the modified code, deploy the modified code in a production environment; and
responsive to the release authorization decision including denial of the request to release the modified code:
transfer the modified code to the developer portal for further testing; and
generate and transmit, to a developer computing device, a notification of the release authorization decision including the denial of the request to release the modified code, wherein transmitting the notification includes causing display of the notification on a display of the developer computing device.

16. The one or more non-transitory computer-readable media of claim 15, wherein the modified code is generated by the developer computing device via the developer portal.

17. The one or more non-transitory computer-readable media of claim 15, wherein the modified code testing data is generated by executing one or more tests on the modified code via the developer portal.

18. The one or more non-transitory computer-readable media of claim 15, wherein the one or more requirements for release of the modified code is based on the type of release.

19. The one or more non-transitory computer-readable media of claim 15, wherein the type of release is one of: a major release, a minor release, an integrated release or an emergency fix.

20. The one or more non-transitory computer-readable media of claim 15, wherein the notification of the release authorization decision including the denial of the request to release the modified code includes identification of the further testing.

* * * * *